(12) United States Patent
Zhang et al.

(10) Patent No.: US 11,772,355 B2
(45) Date of Patent: Oct. 3, 2023

(54) AEROGEL COMPOSITE HEAT PRESERVATION FIRE-PROOF PLATE AND MANUFACTURING PROCESS THEREOF

(71) Applicant: CNBM Technology Innovation Academy (Shandong) Co., Ltd., Zaozhuang (CN)

(72) Inventors: Zhonglun Zhang, Zaozhuang (CN); Mingming Wang, Zaozhuang (CN)

(73) Assignee: CNBM Technology Innovation Academy (Shandong) Co., Ltd., Zaozhuang (CN)

(*) Notice: Subject to any disclaimer, the term of this patent is extended or adjusted under 35 U.S.C. 154(b) by 0 days.

(21) Appl. No.: 18/089,610

(22) Filed: Dec. 28, 2022

(65) Prior Publication Data
US 2023/0271400 A1 Aug. 31, 2023

(30) Foreign Application Priority Data
Feb. 28, 2022 (CN) .......................... 202210188574.0

(51) Int. Cl.
*B32B 3/20* (2006.01)
*B32B 3/30* (2006.01)
(Continued)

(52) U.S. Cl.
CPC ................ *B32B 3/20* (2013.01); *B32B 3/266* (2013.01); *B32B 3/30* (2013.01); *B32B 7/12* (2013.01);
(Continued)

(58) Field of Classification Search
CPC ...... B32B 2307/3065; B32B 2307/304; B32B 2305/022; B32B 2250/03;
(Continued)

(56) References Cited

FOREIGN PATENT DOCUMENTS

| CN | 208168335 U | 11/2018 |
|---|---|---|
| CN | 209819048 U | 12/2019 |

(Continued)

OTHER PUBLICATIONS

Machine translation of CN 112497872 A; Junxiong Li; Publication Date: Mar. 16, 2021.*

*Primary Examiner* — Vishal I Patel
(74) *Attorney, Agent, or Firm* — Nitin Kaushik

(57) ABSTRACT

The present application discloses an aerogel composite heat preservation fire-proof plate and a manufacturing process thereof. The aerogel composite heat preservation fire-proof plate comprises an upper surface layer, a fire-proof layer, a heat insulation layer, a polyurethane layer, and a lower surface layer which are compositely arranged from top to bottom in sequence. The interior of the fire-proof layer is hollow and filled with aluminum hydroxide particles. Working holes are uniformly formed in the fire-proof layer. Sealing double-screw bolts are connected in the working holes. Aerogel mounting grooves are uniformly formed in the surface, close to the fire-proof layer, of the heat insulation layer. There are heat insulation air cavities at one side, far away from the fire-proof layer, of the mounting grooves. The air cavities are communicated with all the mounting grooves. Aerogel fillers are arranged in the mounting grooves.

2 Claims, 6 Drawing Sheets

(51) Int. Cl.
  *B32B 7/12*    (2006.01)
  *B32B 27/40*   (2006.01)
  *B32B 37/12*   (2006.01)
  *B32B 37/20*   (2006.01)
  *B32B 38/00*   (2006.01)
  *B32B 38/08*   (2006.01)
  *B32B 39/00*   (2006.01)
  *B32B 3/26*    (2006.01)

(52) U.S. Cl.
  CPC .............. *B32B 27/40* (2013.01); *B32B 37/12* (2013.01); *B32B 37/20* (2013.01); *B32B 38/0004* (2013.01); *B32B 38/0036* (2013.01); *B32B 38/08* (2013.01); *B32B 39/00* (2013.01); *B32B 2250/03* (2013.01); *B32B 2260/025* (2013.01); *B32B 2266/126* (2016.11); *B32B 2305/022* (2013.01); *B32B 2305/30* (2013.01); *B32B 2307/304* (2013.01); *B32B 2307/3065* (2013.01)

(58) Field of Classification Search
  CPC ... B32B 2266/126; B32B 37/20; B32B 37/12; B32B 27/40; B32B 7/12; B32B 3/30
  See application file for complete search history.

(56) References Cited

FOREIGN PATENT DOCUMENTS

| | | | |
|---|---|---|---|
| CN | 112497872 A | * | 3/2021 |
| CN | 112497872 A | | 3/2021 |

* cited by examiner

AEROGEL COMPOSITE HEAT PRESERVATION FIRE-PROOF PLATE AND MANUFACTURING PROCESS THEREOF

CROSS-REFERENCE TO RELATED APPLICATIONS

The application claims priority to Chinese patent application No. 202210188574.0, filed on Feb. 28, 2022, the entire contents of which are incorporated herein by reference.

TECHNICAL FIELD

The present application relates to the technical field of fire-proof plates, and more particularly relates to an aerogel composite heat preservation fire-proof plate and a manufacturing process thereof.

BACKGROUND

A fire-proof plate, also known as a fire-resistant plate, is a kind of thermosetting resin impregnated paper high-pressure laminated plate. The fire-proof plate is a kind of fire-resistant building material for surface decoration with rich surface colors, lines, and special physical properties. Aerogel is a kind of nano-scale porous solid material formed by replacing a liquid phase in a gel with gas in a certain drying mode by a sol-gel method, and has the properties of the gel, that is, has the effects of expansion, thixotropy, and desizing.

Most of existing aerogel fire-proof plates are of sandwich structures. For example, the China invention patent with the publication number of CN105569200A discloses a glass wool silica-alumina aerogel composite sandwich heat preservation fire-proof plate. The composite sandwich heat preservation fire-proof plate consists of upper and lower surface layers and a glass wool reinforced silica-alumina aerogel intermediate layer.

In view of the above-mentioned related technologies, the inventor believes that the sandwich type heat insulation composite plate is compositely provided with the aerogel in the middle layer of the plate, which is mainly aimed at the heat radiation insulation of transverse penetration, part of the heat is transferred longitudinally through the surface layer, and the longitudinal insulation of heat is not enough.

SUMMARY

In order to further improve the longitudinal heat insulation performance of the heat preservation fire-proof plate, the present application provides an aerogel composite heat preservation fire-proof plate and a manufacturing process thereof.

The aerogel composite heat preservation fire-proof plate and the manufacturing process thereof provided by the present application adopt the following technical scheme.

The aerogel composite heat preservation fire-proof plate includes an upper surface layer, a fire-proof layer, a heat insulation layer, a polyurethane layer, and a lower surface layer which are compositely arranged from top to bottom in sequence. The interior of the fire-proof layer is hollow and filled with aluminum hydroxide particles. Evenly distributed working holes are formed in the fire-proof layer. Scaling double-screw bolts are connected in the working holes. Aerogel mounting grooves are uniformly formed in the surface, close to the fire-proof layer, of the heat insulation layer. Heat insulation air cavities which are located at one side, far away from the fire-proof layer, of the aerogel mounting grooves, are formed in the heat insulation layer. The heat insulation air cavities are communicated with all the aerogel mounting grooves. Acrogel fillers are arranged in the aerogel mounting grooves.

According to the above technical scheme, the interior of the fire-proof layer is hollow, which is beneficial to isolating the heat radiated transversely; the aerogel mounting grooves formed in the heat insulation layer are internally filled with the aerogel fillers; the aerogel fillers improve the transverse heat insulation performance of the heat insulation layer; the evenly distributed aerogel fillers make the heat be continuously reflected when the heat is transferred longitudinally through the heat insulation layer, so that the heat transfer efficiency is reduced, and then the longitudinal heat insulation performance of the fire-proof plate is improved.

Further, the heat insulation layer is made of a perlite plate. The aerogel mounting grooves are spherical grooves. The aerogel fillers fill the aerogel mounting grooves. The depth of the aerogel mounting groove is consistent with the thickness of the fire-proof layer.

According to the above technical scheme, the heat insulation layer is made of the perlite plate, and has good heat insulation and fire-proof performances, and the aerogel mounting grooves are spherical, so that the surfaces of the aerogel fillers have good reflectivity for heat in all directions, and the boundary between aerogel and the heat insulation layer is also beneficial to further improving the heat insulation effect of the heat insulation layer.

A manufacturing process of the aerogel composite heat preservation fire-proof plate includes the following steps:
  S1. preparing materials, cutting and manufacturing a surface decorative plate, a fire-proof plate, a heat insulation plate, and a polyurethane plate;
  S2. compounding, sequentially pasting and fixing the fire-proof plate, the heat insulation plate, and the polyurethane plate;
  S3. discharging aerogel, placing raw materials of the aerogel fillers into the working holes in the fire-proof layer;
  S4. pressing aerogel, pressing the aerogel fillers into the aerogel mounting grooves and sealing the working holes;
  S5. packaging, compounding the surface decorative plate on the fire-proof layer the polyurethane layer, and
  S6. inspection.

According to the above technical scheme, the manufacturing process is simple in working procedure and can be used for efficiently manufacturing the aerogel composite heat preservation fire-proof plate with the good longitudinal heat insulation performance.

Further, an aerogel pressing device is introduced in the step 3 and the step 4; the aerogel pressing device includes a first conveyor belt, a workbench, and a second conveyor belt which are arranged in sequence; the center of the workbench is provided with a re-driving mechanism used for driving a product on the workbench; and two sides of the workbench are respectively provided with an aerogel discharging mechanism used for discharging aerogel in each working hole of the product, and an aerogel pressing mechanism used for pressing the aerogel fillers in the working holes into the aerogel mounting grooves.

According to the above technical scheme, the product compounded in the step 2 is conveyed to the workbench by the first conveyor belt; the aerogel discharging mechanism puts the raw materials of the aerogel fillers into each working hole in the product; then the aerogel pressing mechanism presses the aerogel fillers in the working holes into the aerogel mounting grooves in the heat insulation layer of the product, so that the acrogel fillers are arranged for filling; then the re-driving mechanism drives the product to move to the second conveyor belt; and the product is moved to the next working procedure through the second conveyor belt. The automation level is high. The discharging and aerogel pressing for the fire-proof plate can be completed at one time. The occupied area is small. The manufacturing efficiency is high.

Further, the aerogel discharging mechanism includes a first operating arm fixed on to side wall of the workbench; a discharging plate with a hollow interior is arranged at the end of the first operating fixedly and horizontally; discharging pipes which are arranged in one-to-one correspondence with the working holes of the product are uniformly arranged on the bottom surface of the discharging plate; the discharging pipes are used for placing the aerogel fillers; adsorption holes communicated with the interiors of the discharging pipes are formed in the bottom surface of the discharging plate; rubber sleeves are arranged in the adsorption holes in a penetrating mode; the ends of the rubber sleeves extend into the discharging pipes; the aerogel discharging mechanism further includes a vacuum pump arranged outside the workbench; and a vacuum pipe is connected between the vacuum pump and the discharging plate and is communicated with the interior of the discharging plate.

According to the above technical scheme, when the product is moved to the workbench, the first operating arm drives the discharging plate to a location where the raw materials of the aerogel fillers are placed, so that the aerogel fillers are inserted into each discharging pipe. Then the vacuum pump is started, so that negative pressure is formed in the discharging plate, and the aerogel fillers are adsorbed in the discharging pipes. The arrangement of the rubber sleeves enhances the adsorption on the aerogel fillers. Then the first operating arm drives the discharging plate to the upper side of the product, and the first operating arm lowers the discharging plate, so that the aerogel fillers are aligned with each working hole in the product. Finally, the vacuum pump releases the negative pressure in the discharging plate, so that the aerogel fillers are accurately placed in the working holes, and the discharging efficiency is high.

Further, a plurality of air compressing grooves are formed upwards and concavely in the bottom surface of the discharging plate and are evenly distributed among the discharging pipes.

According to the above technical scheme, the arrangement of the air compressing grooves is beneficial to enhancing the adsorption of the negative pressure in the discharging plate on the raw materials of the aerogel fillers, thereby preventing the aerogel fillers from falling.

Further, corner fixed mechanisms are further arranged on the workbench. The corner fixed mechanisms include corner sleeves slidably arranged on the workbench, and electric push rods fixed at the corners of the workbench. Piston rods of the electric push rods are fixedly connected to the corner sleeves. The corn sleeves are used for sleeve connection with corner ends of the product. There are totally four groups of corner fixed mechanisms. The four groups of corner fixed mechanisms are respectively arranged at the four corners of the workbench.

According to the above technical scheme, when the fire-proof plate product is moved to the workbench, the electric push rods at the four corners of the workbench are started, so that the corner sleeves move towards the product until the four corners are in sleeve connection with the four corners of the product to fix the product. In addition, the position of the product can be adjusted by the coordinated driving of the electric push rods, which is beneficial to improving the accuracy of aerogel discharging.

Further, a transition curved surface is formed on the inner edge of the corner sleeve. The corner sleeve is made of polytetrafluoroethylene. The inner thickness of the corner sleeve is consistent with the sum of the thicknesses of the fire-proof layer, the heat insulation layer, and the polyurethane layer of the product.

According to the above technical scheme, the transition curved surfaces in the corner sleeves and the adoption of the material are beneficial to pressing the corners of the product into the corner sleeves, thus preventing the product from colliding with the corner sleeves by mistake. The combination of the fire-proof layer, the heat insulation layer, and the polyurethane layer on the product is further enhanced after the corners of the product are pressed into the corner sleeves.

Further, the aerogel pressing mechanism includes a second mechanical arm fixedly arranged on the side wall of the workbench. The second mechanical arm is used for installing sealing double-screw bolts on the product. A heater for heating the product is fixedly arranged in the workbench.

According to the technical scheme, the second mechanical arm is used for screwing the sealing double-screw bolts on the product, and at the same time, the heater is started, so that the surfaces of the aerogel fillers are in a molten state. In the process of extruding the aerogel fillers by the sealing double-screw bolts, part of the aerogel fillers are screwed into thread gaps between the sealing double-screw bolts and the working holes, so that the sealing property between the scaling double-screw bolts and the fire-proof layer is improved, and the heat insulation performance of the fire-proof layer is further improved.

Further, an adjusting groove is formed in the center of the workbench, and the re-driving mechanism is arranged in the adjusting groove; and the re-driving mechanism comprises a rotating motor fixed at the bottom of the adjusting groove, and a third conveyor belt fixed at an output end of the rotating motor.

According to the above technical scheme, when the product is moved to the workbench, the product is located on the third conveyor belt, and the rotating motor is started to drive the product to rotate, so that the orientation of the product is adjusted, and the corner ends of the product are aligned with the corner sleeves.

In summary, the present application includes at least one of the following beneficial technical effects:
  (1) the interior of the fire-proof layer is hollow, which is beneficial to isolating the heat radiated transversely; the aerogel mounting grooves formed in the heat insulation layer are internally filled with the aerogel fillers; the aerogel fillers improve the transverse heat insulation performance of the heat insulation layer; the evenly distributed aerogel fillers make the heat be continuously reflected when the heat is transferred longitudinally through the heat insulation layer, so that the heat transfer efficiency is reduced, and then the longitudinal heat insulation performance of the fire-proof plate is further enhanced;
  (2) the manufacturing process is simple in working procedure and can be used for efficiently manufacturing the aerogel composite heat preservation fire-proof plate with the good longitudinal heat insulation performance.

(3) the product compounded in the step 2 is conveyed to the workbench by the first conveyor belt; the aerogel discharging mechanism puts the raw materials of the aerogel fillers into each working hole in the product; then the aerogel pressing mechanism presses the aerogel fillers in the working holes into the aerogel mounting grooves in the heat insulation layer of the product, so that the aerogel fillers are arranged for filling; then the re-driving mechanism drives the product to move to the second conveyor belt; and the product is moved to the next working procedure through the second conveyor belt. The automation level is high. The discharging and aerogel pressing for the fire-proof plate can be completed at one time. The occupied area is small. The manufacturing efficiency is high.

REFERENCE NUMBERS IN FIGURES 11, upper surface layer; 12. Fire-proof layer; 121. Aluminum hydroxide particles; 122. Working hole; 123. Sealing double-screw bolt; 13. Heat insulation layer; 131. Aerogel mounting groove; 132. Aerogel filler; 133. Heat insulation air cavity; 14. Polyurethane layer; 15. Lower surface layer; 2. First conveyor belt; 3. Workbench; 31. Adjusting groove; 4. Second conveyor belt; 5. Re-driving mechanism; 51. Rotating motor; 52. Third conveyor belt; 6. Aerogel discharging mechanism; 61. First operating arm; 62. Discharging plate; 621. Discharging pipe; 622. Air compressing groove; 63. Vacuum pump; 631. Vacuum pipe; 7, aerogel pressing mechanism; 8. Corner fixed mechanism; 81. Electric push rod; 82. Corner sleeve; 81. Transition curved surface.

DETAILED DESCRIPTION OF THE EMBODIMENTS

A clear and complete description will be made to the technical solutions in the embodiments of the present application below in combination with the accompanying drawings in the embodiments of the present application. Apparently, the embodiments described are only part of the embodiments of the present application, not all of them. All other embodiments obtained by those skilled in the art without creative efforts based on the embodiments of the present application shall fall within the protection scope of the present application.

In the description of the present application, it should be noted that the orientations or position relationships indicated by terms "upper", "lower", "inside", "outside", "top/bottom end" and the like are based on orientations or position relationships shown in drawings. These terms are only for the convenience of describing the present application and simplifying the description, but do not indicate or imply that the specified device or component must have a specific orientation and must be constructed and operated in the specific orientation, so that it can not be understood as a limitation to the present application. In addition, the terms "first" and "second" are only used for descriptive purposes, and cannot be understood as indicating or implying relative importance.

In the description of the present application, it should be noted that unless otherwise explicitly specified or defined, the terms such as "mount", "provided with", "sleeved/sleeve connection", and "connection" should be understood in a broad sense. For example, the connection may be a fixed connection, a detachable connection, or an integral connection; or the connection may be a mechanical connection or an electrical connection; or the connection may be a direct connection, an indirect connection through an intermediary, or internal communication between two components. Persons of ordinary skill in the art may understand the specific meanings of the foregoing terms in the present application according to specific situations.

The present application will be further described in detail below with reference to FIG. 1 to FIG. 6.

Embodiment I

Figure 1:
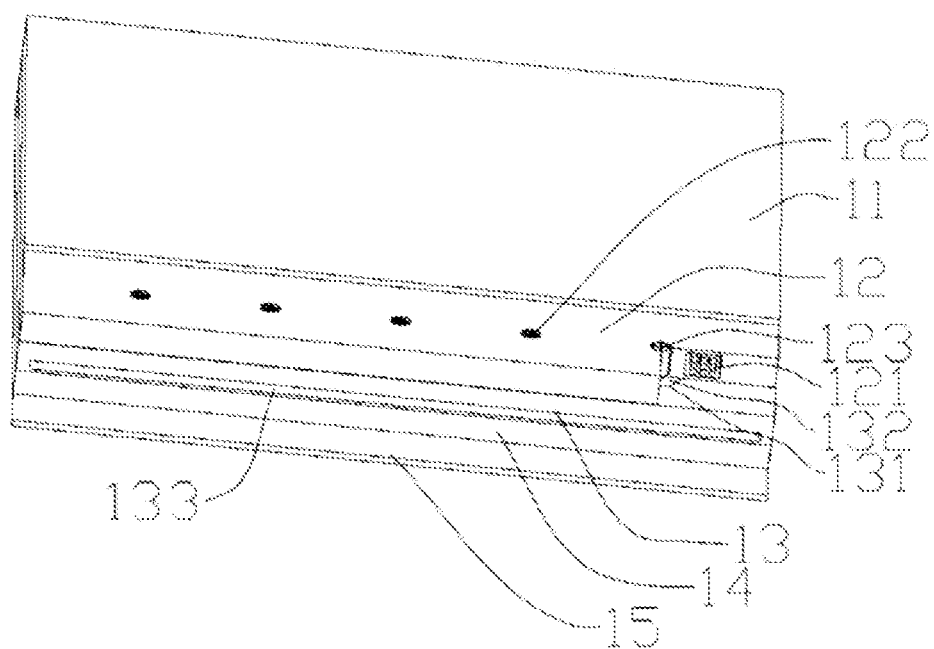
FIG. 1 is a schematic structural diagram of an aerogel composite heat preservation fire-proof plate of embodiment I.

The embodiment of the present application discloses an aerogel composite heat preservation fire-proof plate. Referring to FIG. 1, the aerogel composite heat preservation fire-proof plate includes an upper surface layer 11, a fire-proof layer 12, a heat insulation layer 13, a polyurethane layer 14, and a lower surface layer 15 which are compositely arranged from top to bottom in sequence. The interior of the fire-proof layer 12 is hollow and filled with aluminum hydroxide particles 121. Evenly distributed working holes 122 are formed in the fire-proof layer 12; and sealing double-screw bolts 123 are connected in the working holes 122. The heat insulation layer 13 is made of a perlite plate. Aerogel mounting grooves 131 are uniformly formed in the surface, close to the fire-proof layer 12, of the heat insulation layer 13. Heat insulation air cavities 133 which are located at one side, far away from the fire-proof layer 12, of the aerogel mounting grooves 131, are formed in the heat insulation layer 13. The heat insulation air cavities 133 are communicated with all the aerogel mounting grooves 131. Aerogel fillers 132 are arranged in the aerogel mounting grooves 131. The aerogel mounting grooves 131 are spherical grooves. The aerogel fillers 132 fill the aerogel mounting grooves 131. The depth of the aerogel mounting groove 131 is consistent with the thickness of the fire-proof layer 12.

According to the embodiment I of the present application, the implementation principle of the aerogel composite heat insulation fire-proof plate is as follows: the interior of the fire-proof layer 12 is hollow, which is beneficial to isolating the heat radiated transversely; the aerogel mounting grooves 131 formed in the heat insulation layer 13 are internally filled with the aerogel fillers 132; the aerogel fillers 132 improves the transverse heat insulation performance of the heat insulation layer 13; the evenly distributed aerogel fillers 132 make the heat be continuously reflected when the heat is transferred longitudinally through the heat insulation layer 13, so that the heat transfer efficiency is reduced, and then the longitudinal heat insulation performance of the fire-proof plate is further improved; in addition, in the filling process of the aerogel fillers 132, excess air is discharged into the heat insulation air cavities 133 to prevent the inadequate filling of the aerogel filler 132. The design is ingenious.

Embodiment II

Figure 2:
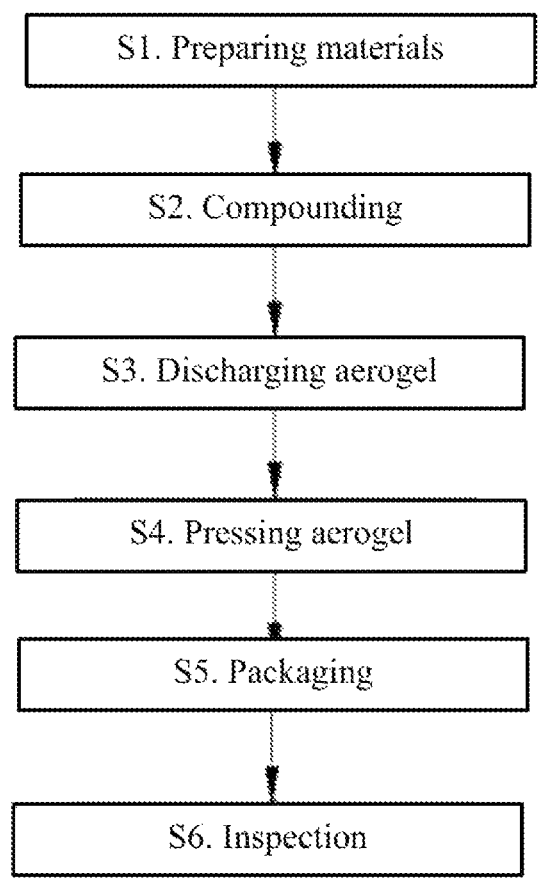
FIG. 2 is a schematic diagram of steps of a manufacturing process of an aerogel composite heat preservation fire-proof plate of embodiment II.

Referring to FIG. 2, a manufacturing process of the aerogel composite heat preservation fire-proof plate includes the following steps:
S1. preparing materials, cutting and manufacturing a surface decorative plate, a fire-proof plate, a heat insulation plate, and a polyurethane plate;
S2. compounding, sequentially pasting and fixing the fire-proof plate, the heat insulation plate and the polyurethane plate;
S3. discharging aerogel, placing raw materials of the aerogel fillers 132 into the working holes 122 in the fire-proof layer 12;
S4. pressing aerogel, pressing the aerogel fillers 132 into the aerogel mounting grooves 131 and scaling the working holes 122;
S5. packaging, compounding the surface decorative plate on the fire-proof layer 12 the polyurethane layer 14; and
S6. inspection.

According to the embodiment II of the present application, the implementation principle of the manufacturing process of the aerogel composite heat insulation fire-proof plate is as follows: the manufacturing process is simple in working procedure and can be used for efficiently manufacturing the aerogel composite heat preservation fire-proof plate with the good longitudinal heat insulation performance.

Embodiment III

Figure 3:
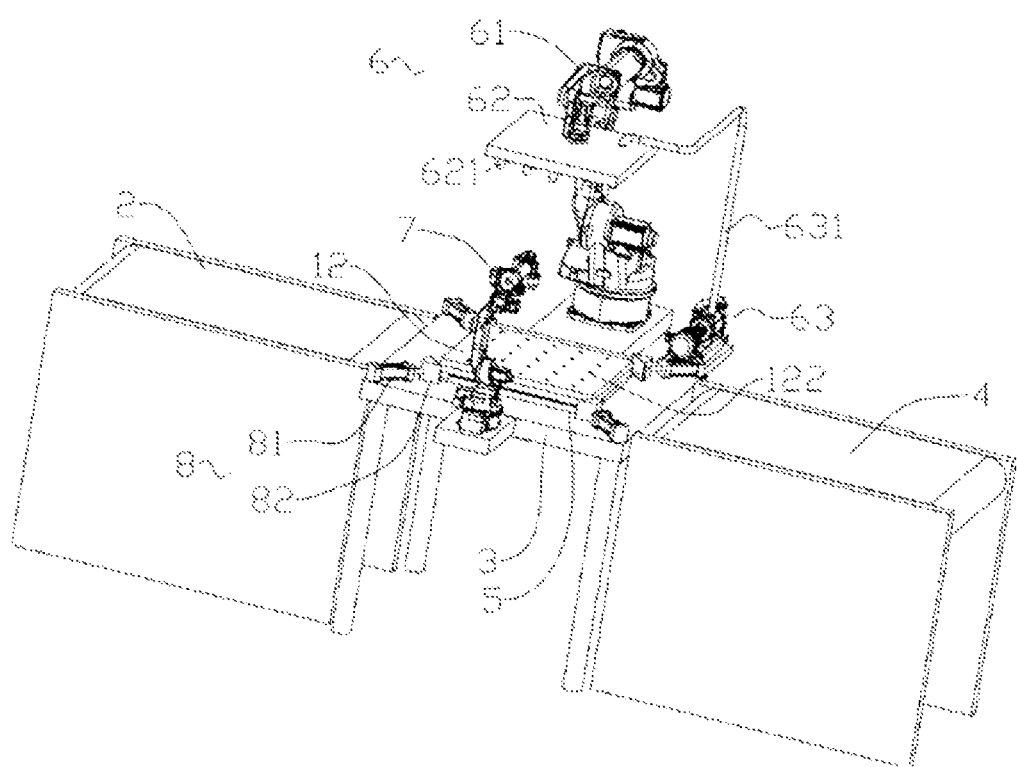
FIG. 3 is a schematic structural diagram of an aerogel pressing device of embodiment III.

Referring to FIG. 3, the present embodiment is different from the embodiment II in that: an aerogel pressing device is introduced in the step 3 and the step 4; the aerogel pressing device includes a first conveyor belt 2, a workbench 3, and a second conveyor belt 4 which are arranged in sequence; the center of the workbench 3 is provided with a re-driving mechanism 5 used for driving a product on the workbench 3; and two sides of the workbench 3 are respectively provided with an aerogel discharging mechanism 6 used for discharging aerogel in each working hole 122 of the product, and an aerogel pressing to mechanism 7 used for pressing the aerogel fillers 132 in the working holes 122 into the aerogel mounting grooves 131.

Figure 4:
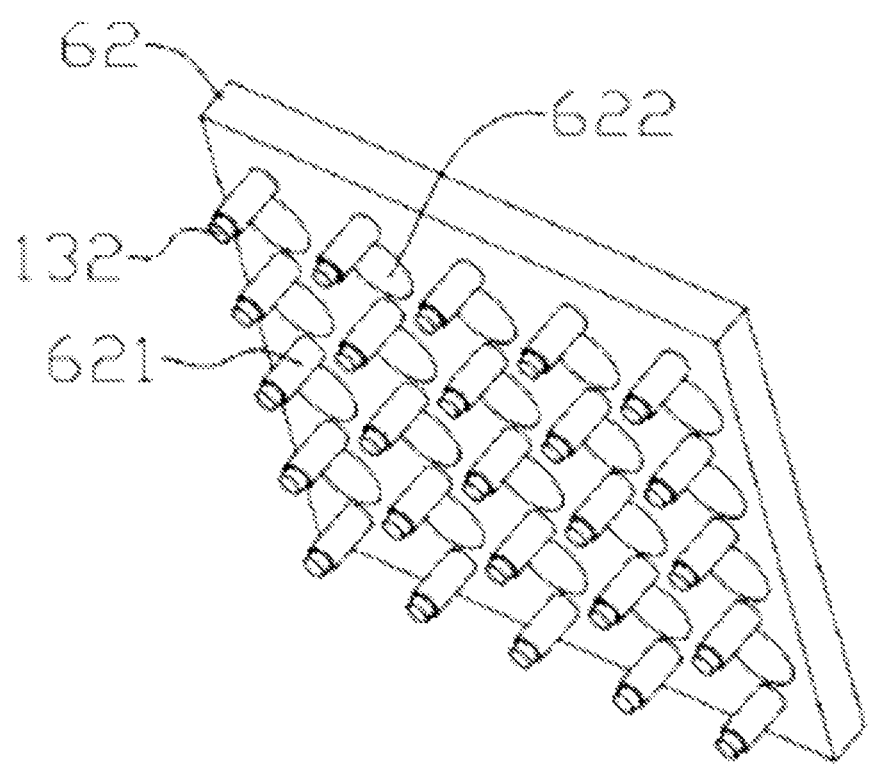
FIG. 4 is a schematic structural diagram of a discharging plate.

Referring to FIG. 3, the aerogel discharging mechanism 6 includes a first operating arm 61 fixed to the side wall of the workbench 3, and a discharging plate 62 with a hollow interior is arranged at the end of the first operating arm 61 fixedly. As shown in FIG. 4, the discharging plate 62 is horizontally arranged; discharging pipes 621 which are arranged in one-to-one correspondence with the working holes 122 of the product are uniformly arranged on the bottom surface of the discharging plate 62; the discharging pipes 621 are used for placing the aerogel fillers 132; adsorption holes communicated with the interiors of the discharging pipes 621 are formed in the bottom surface of the discharging plate 62; rubber sleeves are arranged in the adsorption holes in a penetrating mode; the ends of the rubber sleeves extend into the discharging pipes 621; the aerogel discharging mechanism 6 further includes a vacuum pump 63 arranged outside the workbench 3; and a vacuum pipe 631 is connected between the vacuum pump 63 and the discharging plate 62 and is communicated with the interior of the discharging plate 62. When the product is moved to the workbench 3, the first operating arm 61 drives the discharging plate 62 to a location where the raw materials of the aerogel fillers 132 are placed, so that the aerogel fillers 132 are inserted into each discharging pipe 621. Then the vacuum pump 63 is started, so that negative pressure is formed in the discharging plate 62, and the aerogel fillers 132 are adsorbed in the discharging pipes 621. The arrangement of the rubber sleeves enhances the adsorption on the aerogel fillers 132. Then the first operating arm 61 drives the discharging plate 62 to the upper side of the product, and the first operating arm 61 lowers the discharging plate 62, so that the aerogel fillers 132 are aligned with each working hole 122 in the product. Finally, the vacuum pump 63 releases the negative pressure in the discharging plate 62, so that the aerogel fillers 132 are accurately placed in the working holes 122, and the discharging efficiency is high. In addition, a plurality of air compressing grooves 622 are formed upwards and concavely in the bottom surface of the discharging plate 62 and are evenly distributed among the discharging pipes 621. The arrangement of the air compressing grooves 622 is beneficial to enhancing the adsorption of the negative pressure in the discharging plate 62 on the raw materials of the aerogel fillers 132, thereby preventing the acrogel fillers 132 from falling.

Figure 5:
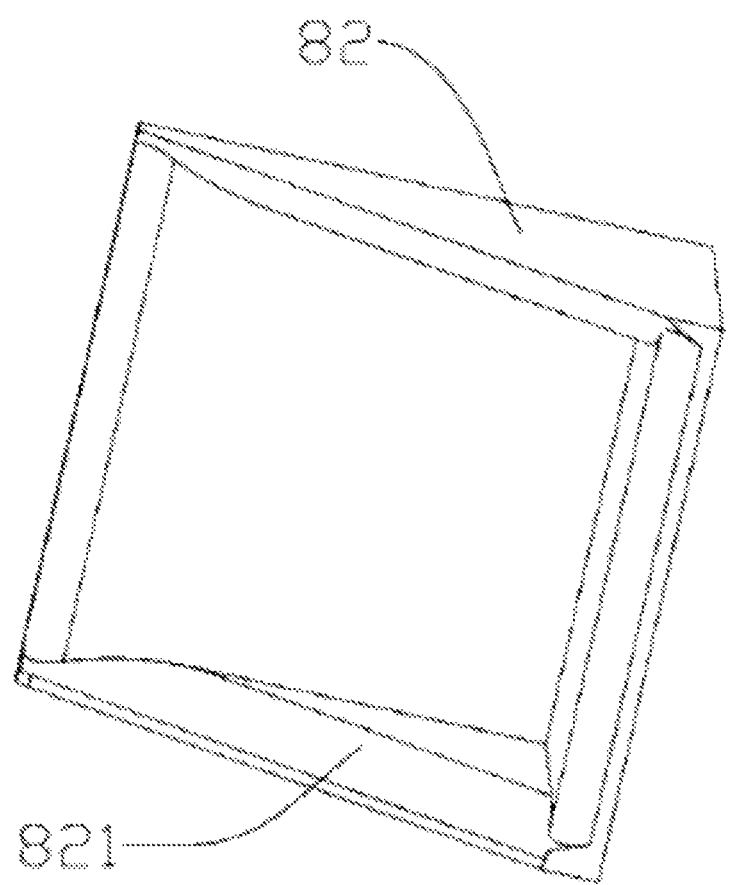
FIG. 5 is a schematic structural diagram of a corner sleeve.

Referring to FIG. 3 and FIG. 5, corner fixed mechanisms 8 are further arranged on the workbench 3. The corner fixed mechanisms 8 include corner sleeves 82 slidably arranged on the workbench 3, and electric push rods 81 fixed at the corners of the workbench 3. Piston rods of the electric push rods 81 are fixedly connected to the corner sleeves 82. The corn sleeves 82 are used for sleeve connection with corner ends of the product. There are totally four groups of corner fixed mechanisms 8. The four groups of corner fixed mechanisms 8 are respectively arranged at the four corners of the workbench 3. When the fire-proof plate product is moved to the workbench 3, the electric push rods 81 at the four corners of the workbench 3 are started, so that the corner sleeves 82 move towards the product until the four corner sleeves 82 are in sleeve connection with the four corners of the product to fix the product. In addition, the position of the product can be adjusted by the coordinated driving of the electric push rods 81, which is beneficial to improving the accuracy of aerogel discharging. A transition curved surface 821 is formed on the inner edge of the corner sleeve 82. The corner sleeve 82 is made of polytetratluoroethylene. The inner thickness of the corner sleeve 82 is consistent with the sum of the thicknesses of the fire-proof layer 12, the heat insulation layer 13, and the polyurethane layer 14 of the product. The transition curved surfaces 821 in the corner sleeves 82 and the adoption of the material are beneficial to pressing the corners of the product into the corner sleeves 82, thus preventing the product from colliding with the corner sleeves 82 by mistake. The combination of the fire-proof layer 12, the heat insulation layer 13, and the polyurethane layer 14 on the product is further enhanced after the corners of the product are pressed into the corner sleeves 82.

Referring to FIG. 3, the aerogel pressing mechanism 7 includes a second mechanical arm fixedly arranged on the side wall of the workbench 3. The second mechanical arm is used for installing sealing double-screw bolts 123 on the product. A heater for heating the product is fixedly arranged in the workbench 3. The second mechanical arm is used for screwing the sealing double-screw bolts 123 on the product, and at the same time, the heater is started, so that the surfaces of the aerogel fillers 132 are in a molten state. In the process of extruding the aerogel fillers 132 by the sealing double-screw bolts 123, part of the aerogel fillers 132 are screwed into thread gaps between the sealing double-screw bolts 123 and the working holes 122, so that the sealing property between the sealing double-screw bolts 123 and the fire-proof layer 12 is improved, and the heat insulation performance of the fire-proof layer 12 is further improved.

Figure 6:
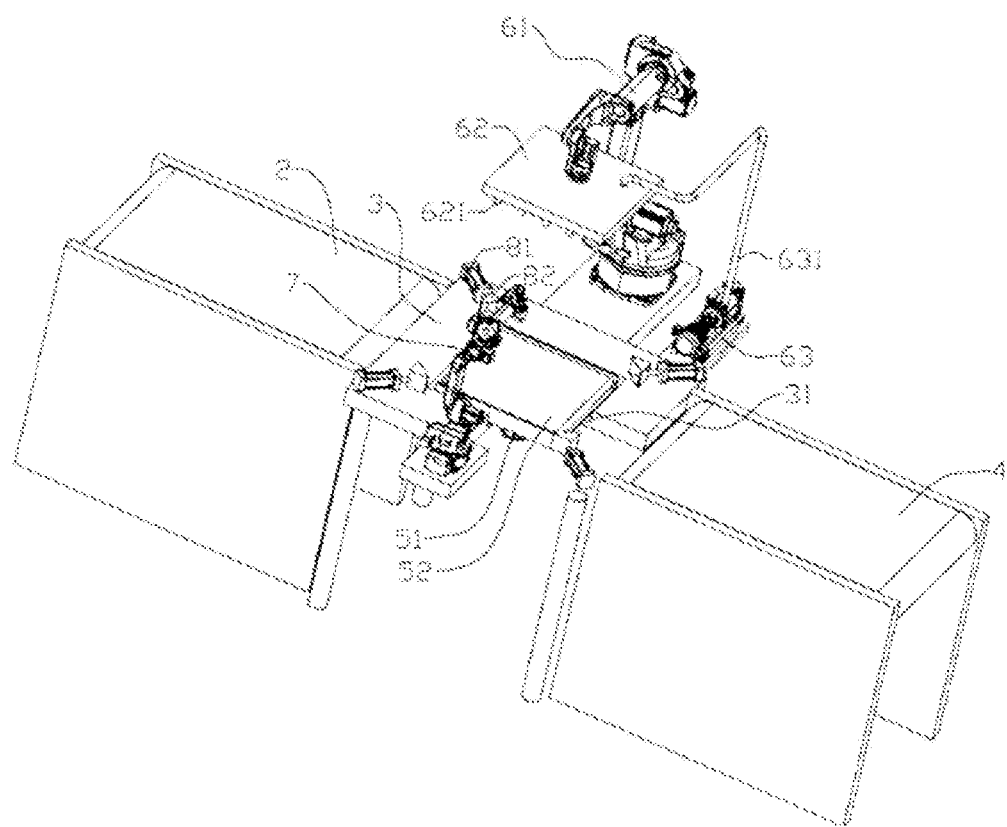
FIG. 6 is a schematic structure diagram of a re-driving mechanism.

Referring to FIG. 6, an adjusting groove 31 is formed in the center of the workbench 3. The re-driving mechanism 5 is arranged in the adjusting groove 31. The re-driving mechanism 5 includes a rotating motor 51 fixed at the bottom of the adjusting groove 31, and a third conveyor belt 52 fixed at an output end of the rotating motor 51. When the product is moved to the workbench 3, the product is located on the third conveyor belt 52, and the rotating motor 51 is started to drive the product to rotate, so that the orientation of the product is adjusted, and the corner ends of the product are aligned with the corner sleeves 82.

The implementation principle of the aerogel pressing device in the embodiment III of the present application is as follows: the product compounded in the step 2 is conveyed to the workbench 3 by the first conveyor belt 2, and the rotating motor 51 in the re-driving mechanism 5 is started, so that the corner ends of the product are aligned with the corner sleeves 82 in the corner fixed mechanisms 8; then the electric push rods 81 in the corner fixed mechanisms 8 are started to push the corner sleeves 82 to move until the corner sleeves 82 fix the product; then the first operating arm 61 in the aerogel discharging mechanism 6 is coordinated with the vacuum pump 63 to put the raw materials of aerogel fillers 132 into each working hole 122 in the product; then the aerogel pressing mechanism 7 presses the aerogel fillers 132 in the working holes 122 into the aerogel mounting grooves 131 in the heat insulation layer 13 of the product, so that the aerogel fillers 132 are arranged for filling; then the third conveyor belt 52 drives the product to move to the second conveyor belt 4; and the product is moved to the next working procedure through the second conveyor belt 4. The automation level is high. The discharging and aerogel pressing for the fire-proof plate can be completed at one time. The occupied area is small. The manufacturing efficiency is high.

The above description is only preferred embodiments of the present application, and is not intended to limit the scope of protection of the present application. Therefore, all equivalent changes made according to the structure, shape and principle of the present application fall within in the scope of protection of the present application.

What is claimed is:

1. A manufacturing process of an aerogel composite heat preservation fire-proof plate, the aerogel composite heat preservation fire-proof plate comprising an upper surface layer (11), a fire-proof layer (12), a heat insulation layer (13), a polyurethane layer (14) and a lower surface layer (15) which are compositely arranged from top to bottom in sequence, wherein the interior of the fire-proof layer (12) is hollow and filled with aluminum hydroxide particles (121); evenly distributed working holes (122) are formed in the fire-proof layer (12); sealing double-screw bolts (123) are connected in the working holes (122); aerogel mounting grooves (131) are uniformly formed in a surface of the heat insulation layer (13) close to the fire-proof layer (12); heat insulation air cavities (133) which are located at one side, far away from the fire-proof layer (12), of the aerogel mounting grooves (131), are formed in the heat insulation layer (13); the heat insulation air cavities (133) are communicated with all the aerogel mounting grooves (131); aerogel fillers (132) are arranged in the aerogel mounting grooves (131); the heat insulation layer (13) is made of a perlite plate; the aerogel mounting grooves (131) are spherical grooves; the aerogel fillers (132) fill the aerogel mounting grooves (131); a depth of the aerogel mounting groove (131) is consistent with a thickness of the fire-proof layer (12); the process comprises the following steps:

S1, preparing materials, cutting and manufacturing a surface decorative plate, a fire-proof plate, a heat insulation plate, and a polyurethane plate;

S2, compounding, sequentially pasting and fixing the fire-proof plate, the heat insulation plate and the polyurethane plate;

S3, discharging aerogel, placing raw materials of the aerogel fillers (132) into the working holes (122) in the fire-proof layer (12);

S4, pressing aerogel, pressing the aerogel fillers (132) into the aerogel mounting grooves (131) and sealing the working holes (122);

S5, packaging, compounding the surface decorative plate on the fire-proof layer (12) and the polyurethane layer (14); and S6, inspection;

in step S3 and step S4, an aerogel pressing device is introduced; the aerogel pressing device comprises a first conveyor belt (2), a workbench (3) and a second conveyor belt (4) which are arranged in sequence; a center of the workbench (3) is provided with a re-driving mechanism (5) used for driving a product on the workbench (3); two sides of the workbench (3) are respectively provided with an aerogel discharging mechanism (6) used for discharging aerogel in each working hole (122) of the product, and an aerogel pressing mechanism (7) used for pressing the aerogel fillers (132) in the working holes (122) into the aerogel mounting grooves (131); the aerogel discharging mechanism (6) comprises a first operating arm (61) fixed to a side wall of the workbench (3); a discharging plate (62) with a hollow interior is arranged at an end of the first operating arm (61) fixedly and horizontally; discharging pipes (621) which are arranged in one-to-one correspondence with the working holes (122) of the product are uniformly arranged on a bottom surface of the discharging plate (62); the discharging pipes (621) are used for placing the aerogel fillers (132); adsorption holes communicated with the interiors of the discharging pipes (621) are formed in the bottom surface of the discharging plate (62); rubber sleeves are arranged in the adsorption holes in a penetrating mode; ends of the rubber sleeves extend into the discharging pipes (621); the aerogel discharging mechanism (6) further comprises a vacuum pump (63) arranged outside the workbench (3); a vacuum pipe (631) is connected between the vacuum pump (63) and the discharging plate (62) and is communicated with the interior of the discharging plate (62); a plurality of air compressing grooves (622) are formed upwards and concavely in the bottom surface of the discharging plate (62) and are evenly distributed among the discharging pipes (621); corner fixed mechanisms (8) are further arranged on the workbench (3), and comprise corner sleeves (82) slidably arranged on the workbench (3), and electric push rods (81) fixed at the corners of the workbench (3); a piston rod of the electric push rod (81) is fixedly connected to the corner sleeve (82); the corner sleeves (82) are used for sleeve connection with corner ends of the product; there are totally four groups of corner fixed mechanisms (8); the four groups of corner fixed mechanisms (8) are respectively arranged at the corners of the workbench (3); a transition curved surface (821) is formed on an inner edge of the corner sleeve (82); the corner sleeve (82) is made of polytetrafluoroethylene; an inner thickness of the corner sleeve (82) is consistent with a sum of the thicknesses of the fire-proof layer (12), the heat insulation layer (13) and a polyurethane layer (14) of the product; the aerogel pressing mechanism (7) comprises a second operating arm fixedly arranged on the side wall of the workbench (3); the second operating arm is used for installing sealing double-screw bolts (123) on the product; and a heater for heating the product is fixedly arranged in the workbench (3).

2. The manufacturing process of the aerogel composite heat preservation fire-proof plate according to claim 1, wherein an adjusting groove (31) is formed in a center of the workbench (3), and a re-driving mechanism (5) is arranged in the adjusting groove (31); and the re-driving mechanism (5) comprises a rotating motor (51) fixed at a bottom of the adjusting groove (31), and a third conveyor belt (52) fixed at an output end of the rotating motor (51).

* * * * *